United States Patent [19]

Woodhull

[11] Patent Number: 4,515,529
[45] Date of Patent: May 7, 1985

[54] ENERGY TRANSDUCER FOR HYDRAULIC WIND POWER CONVERSION SYSTEM AND INSTRUMENTATION THEREFOR

[76] Inventor: William M. Woodhull, 1815 Ridge Rd., Ontario, N.Y. 14519

[21] Appl. No.: 435,773

[22] Filed: Oct. 21, 1982

[51] Int. Cl.³ .............................................. F04B 21/00
[52] U.S. Cl. ..................................... 417/63; 126/247; 417/334
[58] Field of Search ................. 60/398, 641; 126/247; 416/43; 122/26; 415/2-4; 417/334-336, 63, 22; 290/55

[56] References Cited

U.S. PATENT DOCUMENTS

| | | | |
|---|---|---|---|
| 3,847,507 | 11/1974 | Sakiyama et al. | 417/22 |
| 4,248,194 | 2/1981 | Drutchas et al. | 417/22 X |
| 4,299,198 | 11/1981 | Woodhull | 126/247 |
| 4,370,098 | 1/1983 | McClain et al. | 417/63 |

Primary Examiner—Edward K. Look
Attorney, Agent, or Firm—Robert J. Bird

[57] ABSTRACT

A manually adjustable constriction or orifice to provide a means for optimizing the hydraulic power being converted to heat in a hydraulic windpower conversion system. The hydraulics and constriction are arranged to obtain the proper conditions necessary so that pressure head is converted to velocity head with the sum of the two remaining constant.

Instrumentation to facilitate this optimizing adjustment process. A combination of a pump-speed transducer and a pressure-sensing transducer, along with appropriate electronic circuitry is described which provides an output display of the power being converted to heat.

Instrumentation to accumulate and display the total energy converted to heat. Electronic devices and display equipment transform hydraulic power signals into energy signals, totalize the energy signals over time, and periodically display the accumulated energy count.

1 Claim, 7 Drawing Figures

ENERGY TRANSDUCER FOR HYDRAULIC WIND POWER CONVERSION SYSTEM AND INSTRUMENTATION THEREFOR

BACKGROUND AND SUMMARY OF THE INVENTION

This invention relates to a hydraulic wind power conversion system and more particularly to an energy transducer and system to optimize the power conversion in such a system, and to instrumentation by which optimization is achieved.

The present invention provides improvements and additional features relating to my Pat. No. 4,299,198 issued Nov. 10, 1981, the specification of which is incorporated herein by reference.

This invention is directed to a hydraulic system having an adjustable annular constriction or orifice, and associated power-measuring instrumentation to facilitate the adjustment of this orifice to obtain the proper orifice opening for a perfectly matched load. At this optimum setting, the wind power conversion system is at maximum efficiency to thus maximize its conversion of wind power to heat.

The invention further relates to electronic instrumentation which processes, accumulates, and displays the total of the heat energy derived from the hydraulic power.

In the invention a constriction in the form of an annular opening between the end of a cylindrical spool and a circular orifice, i.e. a spool value, is adjusted during steady wind velocity conditions for maximum hydraulic power as indicated by a peak reading on the associated power measuring device. The fact that maximum power peaks do exist under steady wind conditions was clearly demonstrated in the referenced patent. After the best setting of the annular opening is obtained, the adjustment is locked down and needs no further attention because the system will now extract the maximum power possible from the wind regardless of its velocity.

The power indicating device obtains its output signal by multiplying the pump's rotational speed by the hydraulic pressure generated by the pump. The rotational speed and the pressure across the orifice are derived from suitable transducers which sense these quantities. The multiplying process can utilize any one of several techniques, and the readout display can be analog or digital.

The heat-energy totalizer transforms the power signal into a frequency signal by means of a voltage-controlled oscillator. A counting chain continuously totals the cycles and periodically displays the cycle count which is proportional to the total heat energy obtained from the hydraulic conversion process and therefore from the wind.

The invention can be summarized as a manually adjustable hydraulic valve for optimizing the conversion of hydraulic energy to heat in a hydraulic windpower conversion system. Power indicating instrumentation includes a combination of a pump speed transducer and a hydraulic pressure transducer arranged with appropriate circuitry for multiplying the two parameters to thereby determine power. The resultant product (power) is displayed on a readout device showing in real time the power conversion in the system. Heat energy totalizing instrumentation includes a voltage controlled oscillator to convert the power signal to a frequency signal, a counting chain to continuously total the cycles, each cycle representing a discrete amount of energy, and a readout which periodically displays the accumulated cycle count, the total representing the amount of heat energy extracted from the wind.

DRAWING

DESCRIPTION

Figure 1:
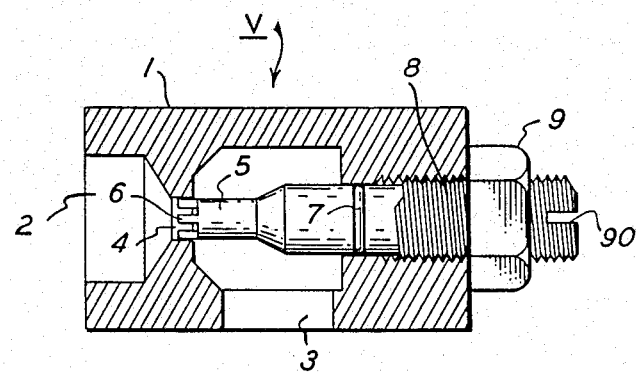
FIG. 1 is a sectional diagram of a hydraulic spool valve with an adjustable annular constriction.

FIG. 1 shows a configuration for an adjustable hydraulic valve V, composed of a suitable housing 1 with hydraulic inlet port 2, outlet port 3, cylindrical orifice bore 4, cylindrical valve spool 5, spool-centering feet 6, O-ring seal 7, threaded adjustment means 8, lock nut 9, and screwdriver adjustment slot 90.

Figure 2:
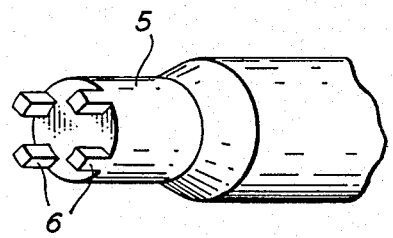
FIG. 2 is a perspective view of the spool element of the valve in FIG. 1, showing its centering feet.

FIG. 2 shows the valve spool 5 with its centering feet 6 protruding from its end to guide, center, and stabilize the spool in the orifice bore 4. The hydraulic valve just described is only exemplary. Many known manually adjustable flow control valves would be suitable.

As explained in the referenced patent, the orifice of valve V converts hydraulic pressure head to velocity head, the sum of the two remaining constant according to Bernoulli's Theorem. Required prevailing conditions for this to occur are negligible frictional losses, streamline flow, and incompressible hydraulic fluid. The flow constriction or orifice provided by hydraulic valve V accomplishes this redistribution of the two types of energy according to Bernoulli's orifice equation:

$$Q = CA\sqrt{\frac{2g}{\rho}P} \qquad \text{(Equation 1)}$$

Where:
Q is volume flowrate in cubic inches per second.
C is the coefficient of discharge, 0.61 being typical for this type of sharp-edged configuration and geometry. Rounded edges and different geometries will alter this coefficient.
A is the total area of the annular flow openings in square inches, i.e. orifice area.
g is the acceleration due to gravity which is 385.9 inches per second per second.
$\rho$ is the hydraulic fluid density in pounds per cubic inch, 0.0318 being typical for hydraulic oil.
P is the hydraulic pressure upstream of the orifice in pounds per square inch.
Putting the various constants into Equation 1 yields $$Q = 95 A \sqrt{P} \qquad \text{(Equation 2)}$$

as the orifice flow-pressure equation. Squaring both sides of this equation and solving for the orifice pressure leads to $$P = 1.108 \frac{Q^2}{A^2} 10^{-4} \qquad \text{(Equation 3)}$$

Hydraulic power W is given by the product of P and Q. Thus, using the proper conversion factors, it follows that $$W = 0.956 \frac{Q^3}{A^2} 10^{-6} \qquad \text{(Equation 4)}$$

This is the basic power conversion equation relating available wind rotor power W in horsepower, pump volume flowrate Q in gallons per minute, and orifice area A in square inches. Because the pump is a positive displacement device, Q is directly proportional to the wind rotor speed. Thus, any given combination of wind rotor and pump requires one unique orifice area to obtain optimum loading so that the wind rotor can operate at its most efficient design speed.

The flow orifice of the hydraulic valve V is adjusted to obtain a maximum of power conversion (Equation 4) by turning the threaded spool valve using a screwdriver in slot 90. After obtaining the optimum adjustment, lock nut 9 is tightened to prevent further movement. O-ring 7 prevents oil leakage around the threaded section 8 of the valve spool.

The optimizing process next described is representative of one possible approach but not necessarily limited to this. First, it is to be understood that the shape and geometry of the hydraulic valve and its orifice can assume many configurations as long as the proper conditions are present so that the standard orifice equation (Equation 1) describes the flow-pressure relationship according to Bernoulli's Theorem. Arriving at the optimum orifice area for a wind rotor and hydraulic system to be manufactured by using calculated areas or by optimization tests performed on a prototype system, and thereafter supplying this sized orifice in fixed form, constitutes the use of this invention. This invention describes a method using theory and adjustment to arrive at a synergistic combination of optimally matched components (wind rotor, pump and orifice) in providing a "wind power system which is inherently self-regulating at its optimum power level," as described in the reference Pat. No. 4,299,198.

Figure 3:
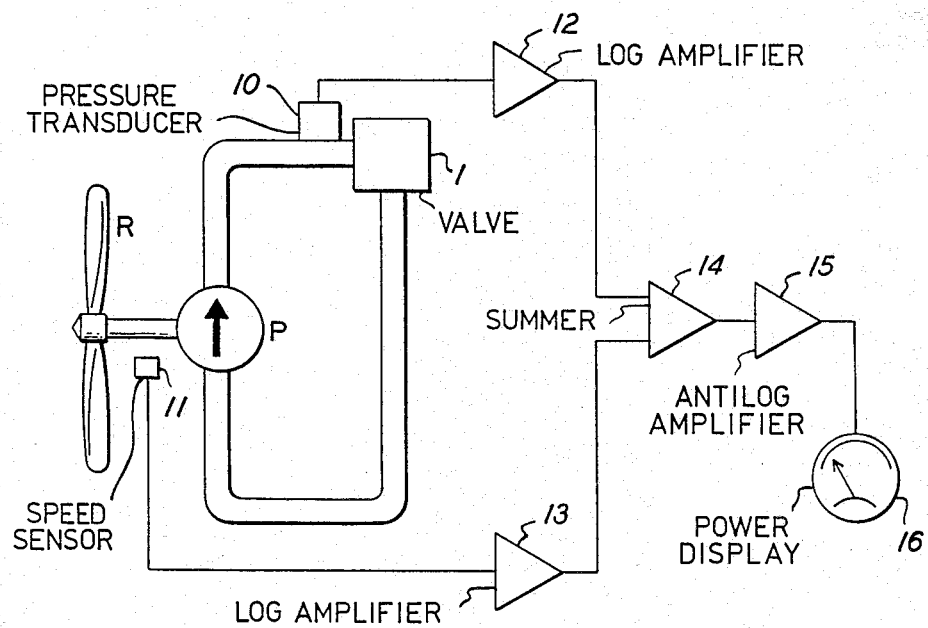
FIG. 3 is a schematic block diagram of one configuration of hydraulic power instrumentation using logarithmic amplifiers.

Referring now to FIG. 3, the hydraulic-power instrumentation will now be described. A pressure sensing transducer 10 installed at the inlet of the orifice produces an electrical signal proportional to hydraulic pressure. These transducers are commercially available items and take many forms. An example of a pressure transducer which converts hydraulic pressure to a proportional electrical voltage is the COMPU-TRAN, a product of International Resistor Company, and specifically its model #70-2927. Adjustments are provided internally to compensate for zero-pressure offset, static precharge pressure, or static elevation head. Through the use of such adjustments and because the outlet or downstream side of the orifice is at or near zero gage pressure, the signal from this pressure transducer is indicative of the pressure across the orifice. Differential pressure transducers are also commercially available which sense the pressure at both the outlet and inlet sides of the orifice so that a true differential pressure signal across the orifice is obtained without resort to compensating adjustments. Differential pressure transducers are relatively complex and therefore expensive, and are not considered necessary here. Pressure measurement upstream of the orifice is all that is required if, as stated above, the downstream side of the orifice is at or near zero gage pressure.

A pump speed signal in the form of a DC voltage is obtained from a suitable speed sensor 11 mounted on the pump. An example of a speed sensor or tachometer which converts pump speed to a proportional electrical voltage is produced by Servo-ILK Products Company as model #SA7356F-1. Because the pump speed is proportional to hydraulic flow, the product of these two electrical signals is proportional to hydraulic power. This multiplication process is carried out using well known and standard technique in both analog and digital form with commercially available equipment. FIG. 3 shows the analog approach in block form using logarithmic amplifiers. The system of FIG. 3 includes pressure sensor 10, speed sensor 11, logarithmic amplifiers 12 and 13, summing amplifier 14, antilogarthmic amplifier 15, and output display device 16.

The logarithmic amplifiers 12 and 13 convert respectively the pressure and speed signals from transducers 10 and 11 to voltages proportional in amplitude to the logarithms of their values. After being added together in the summing amplifier 14, the combined logarithms represent the multiplication product of the pressure and speed signals. The antilogarithmic amplifier 15 converts this logarithmic representation into an output voltage proportional to the actual multiplication product of the pressure and speed signals which is read on output display device 16. Output display device 16 can be an analog meter or digital display, and scaled to read the hydraulic power in any units desired.

Figure 4:
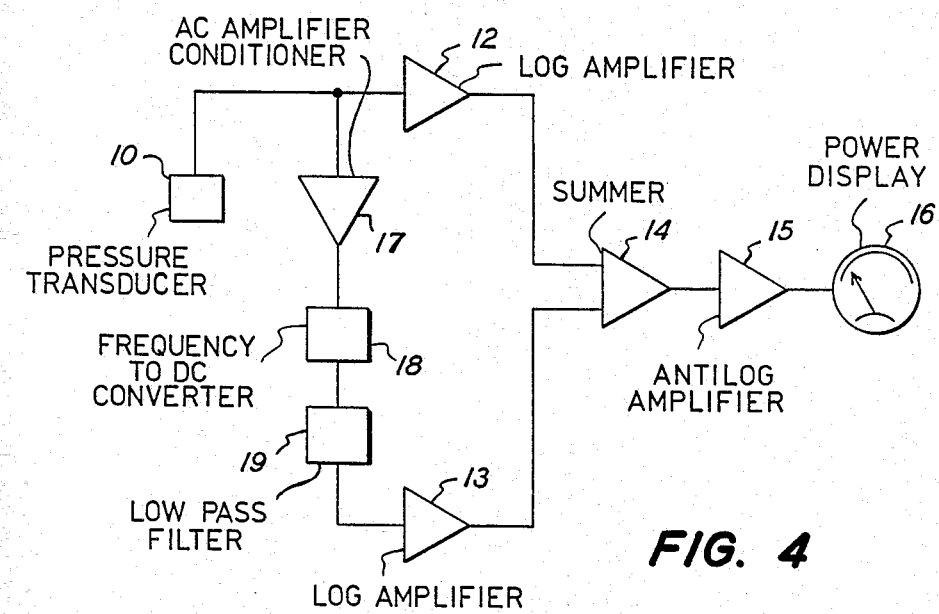
FIG. 4 is a schematic block diagram of another configuration of hydraulic power instrumentation, in which the pump ripple frequently is used for the speed signal.

FIG. 4 shows an alternative method to obtain the pump speed signal from the pump pressure ripple frequency. Positive displacement gear pumps and piston pumps inherently deliver pulsating flow accompanied by corresponding pressure pulsations superimposed on their steady output pressure. Pressure sensors with a high frequency response will deliver this ripple signal in their outputs. FIG. 4 shows this method in block form again using the logarithmic multiplication method of FIG. 3. FIG. 4 includes an AC amplifier-conditioner 17, a frequency-to-DC converter 18, and a low-pass filter 19 (all to replace the speed sensor 11 of FIG. 3). FIG. 4 also includes a pressure transducer 10, amplifiers 12, 13, 14, 15 and readout device 16, all as shown and described in connection with FIG. 3. In operation the ripple frequency contains the pump speed information. This AC signal is amplified and shaped into rectangular pulses by the AC amplifier-conditioner 17, converted to a DC signal whose amplitude is proportional to frequency by the frequency-to-DC converter 18, and smoothed into pure DC by the low-pass filter 19. It is then processed in the same way as the speed signal in FIG. 3.

Figure 5:
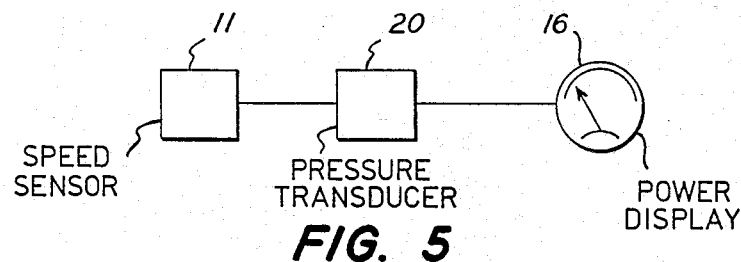
FIG. 5 is a schematic block diagram of an excitation multiplier.

Another method of multiplication can be employed which utilizes the fact that some pressure transducer types must be excited from a DC source and their output voltage is proportional to this excitation level. Common types having this characteristic are strain-gage pressure transducers and bourdon-tube slide-wire potentiometric transducers. FIG. 5 shows such a schematic circuit in block form where pump speed sensor 11 supplies the excitation to strain-gage pressure transducer 20 and output proportional to power is shown on the display device 16. A slide-wire potentiometric transducer could also be used as 20.

Figure 6:
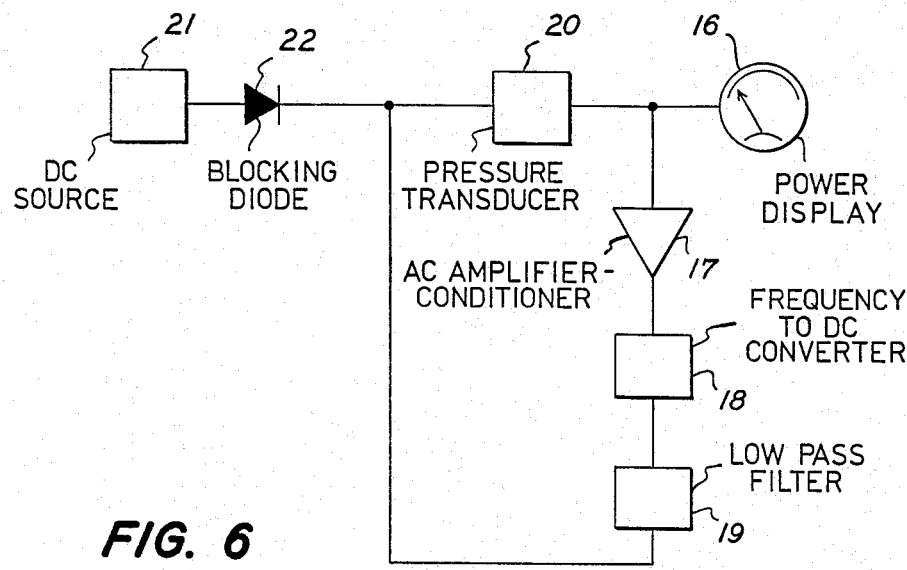
FIG. 6 is a schematic block diagram of a combination excitation multiplier and ripple-frequency speed sensor.

FIG. 6 shows this multiplication method in combination with the pump ripple speed sensing scheme in a bootstrap circuit where the pressure transducer generates its own excitation from the pump ripple signal. FIG. 6 includes an AC amplifier-conditioner 17, frequency-to-DC converter 18, low-pass filter 19, strain-gage pressure transducer 20, display device 16, low level DC excitation source 21, and blocking diode 22. The circuit components operate in the same fashion as they did in FIGS. 4 and 5 except at start-up. The low level DC excitation source 21 supplies the initial current and diode 22 prevents reverse current through 21 at operational levels.

Figure 7:
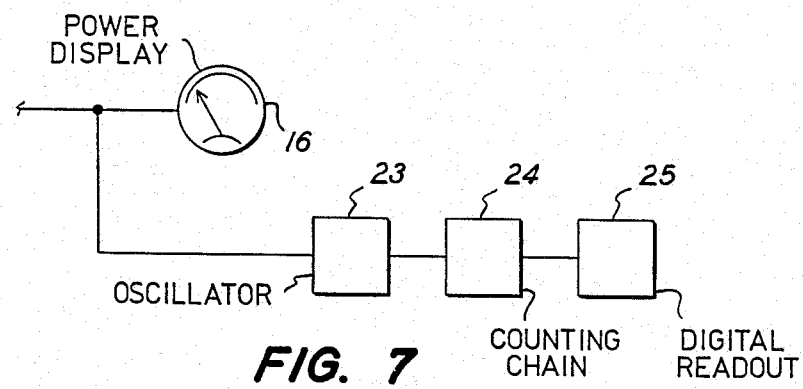
FIG. 7 is a schematic block diagram of an energy totalizer instrumentation system.

FIG. 7 shows the electronic instrumentation for obtaining the accumulated energy count. The scheme is shown in block form because all the components are commercially available electronic items. FIG. 7 includes a voltage-controlled oscillator 23, counting chain 24, and digital readout device 25. If the DC output voltage of the power instrumentation circuit (from amplifier 15) is applied to a voltage-controlled oscillator, a frequency proportional to power results;

$$power \propto frequency$$

Each cycle represents a discrete amount of energy since:

$$Power \propto frequency = \frac{cycles}{unit\ time}$$

so that: $cycles \propto power \times unit\ time = energy$.

Thus, a simple totalizing count of the oscillator cycles will yield the energy output of the wind power conversion system.

Scaling factors can be applied to give the answer in any units desired. This device employs well known digital circuit techniques. Subtraction of the voltage controlled oscillator rest frequency count is also standard digital practice.

What is claimed is:

1. A system for determining and optimizing the power developed in an associated wind rotor operatively connected to a hydraulic pump to motivate hydraulic fluid through an orificed hydraulic system, including:
   speed sensing means to measure operating speed N of said pump and to transmit speed signal information,
   pressure sensing means to measure hydraulic pressure P developed by said pump and to transmit pressure signal information,
   multiplication means to multiply said speed signal information and said pressure signal information to thereby generate a product power signal $N \times P$ indicative of the power W developed in said pump according to the relationship:

$$Power\ W \propto Speed\ N \times Pressure\ P,$$

readout means responsive to said power signal to indicate the power developed in said pump,
   said orifice in said hydraulic system being adjustable to vary said hydraulic pressure and said operating speed to thereby vary the power developed in said pump, and
   means to set said orifice at the size corresponding to the maximum of power developed.

* * * * *